(12) United States Patent
Zhuk

(10) Patent No.: US 10,956,676 B2
(45) Date of Patent: Mar. 23, 2021

(54) DEVELOPMENT FACTORY

(71) Applicant: Yefim Zhuk, Englewood, CO (US)

(72) Inventor: Yefim Zhuk, Englewood, CO (US)

( * ) Notice: Subject to any disclaimer, the term of this patent is extended or adjusted under 35 U.S.C. 154(b) by 621 days.

(21) Appl. No.: 15/822,090

(22) Filed: Nov. 24, 2017

(65) Prior Publication Data
US 2019/0163738 A1 May 30, 2019

(51) Int. Cl.
*G06F 40/30* (2020.01)
*G06F 16/9032* (2019.01)
*G06F 40/51* (2020.01)
*G06Q 10/10* (2012.01)
*H04L 29/08* (2006.01)
*G06F 40/56* (2020.01)

(52) U.S. Cl.
CPC ........ *G06F 40/30* (2020.01); *G06F 16/90332* (2019.01); *G06F 40/51* (2020.01); *G06Q 10/10* (2013.01); *G06F 40/56* (2020.01); *H04L 67/10* (2013.01)

(58) Field of Classification Search
CPC .... G06F 40/30; G06F 16/90332; G06F 40/51; G06F 10/56; G06Q 10/10; H04L 67/10

USPC .......................................................... 706/55
See application file for complete search history.

(56) References Cited

U.S. PATENT DOCUMENTS

| | | | |
|---|---|---|---|
| 10,073,434 B1 * | 9/2018 | Hollander | G05B 19/402 |
| 10,620,611 B2 * | 4/2020 | Meess | B29C 64/393 |
| 2009/0187444 A1 * | 7/2009 | Zhuk | G06Q 10/10 |
| | | | 705/7.14 |

* cited by examiner

*Primary Examiner* — Michael C Zarroli

(57) ABSTRACT

The invention accelerates development and manufacturing by including conversational semantic support systems (CSSS) as active participants and partners of subject matter experts, (SME) in the process.
CSSS receives an initial request from SME, provides a mapping from business goals to existing business tasks, scripted rules and scenarios, automatically moving to the next step of details, when available. The interesting things start when data is not available. At this point the system initiates a set of conversations with other CSSS available on the net. If data are not found, a program initiates a search over public and private data sources, over the Internet and available Data Clouds. The last resort is a conversation with a set of SME connected to the net. Retrieved and approved by SME data is registered while constantly increasing the knowledge of a system and its efficiency.

14 Claims, 14 Drawing Sheets

DEVELOPMENT FACTORY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS_WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

The present invention relates generally to the field of product and services development.

(2) Description of Related Art Including Information Disclosed Under 37 CFR 1.97 and 1.98

More specifically, the invention discloses a system and method that integrates product and service development and knowledge engineering.

BRIEF SUMMARY OF THE INVENTION

The invention accelerates development and manufacturing processes by including conversational semantic support systems (CSSS) as an active participant and a partner of a subject matter expert (SME) in the process.

Development factory consists of a plurality of CSSS, each with its own area of knowledge. Initiated by a request from a SME, CSSS engage in collaborative development and manufacturing, where collaboration with knowledge-driven systems becomes the leading element of the development.

Traditionally, a user initiates each step of development and in each step initiates communications with a computer program. A program is a passive participant in the process, responding to search requests with data.

The invention elevates the role of a computer program to almost equal partnership. The program is trying to "understand" the meaning of the conversation. When successful, it comes back not only with data but also with its own initiation of the next step. If not successful, the program comes back with a clarifying question, making sure that ambiguities are resolved.

CSSS includes a conversational initiator with a set of initial scripts to prompt a SME to expand the initial idea with more details.

This eliminates or essentially decreases the layer of translations, not only saving time and resources, but preventing the "lost in translation" cases, especially often happened in big projects that involve many teams.

DETAILED DESCRIPTION OF THE INVENTION

Figure 1:
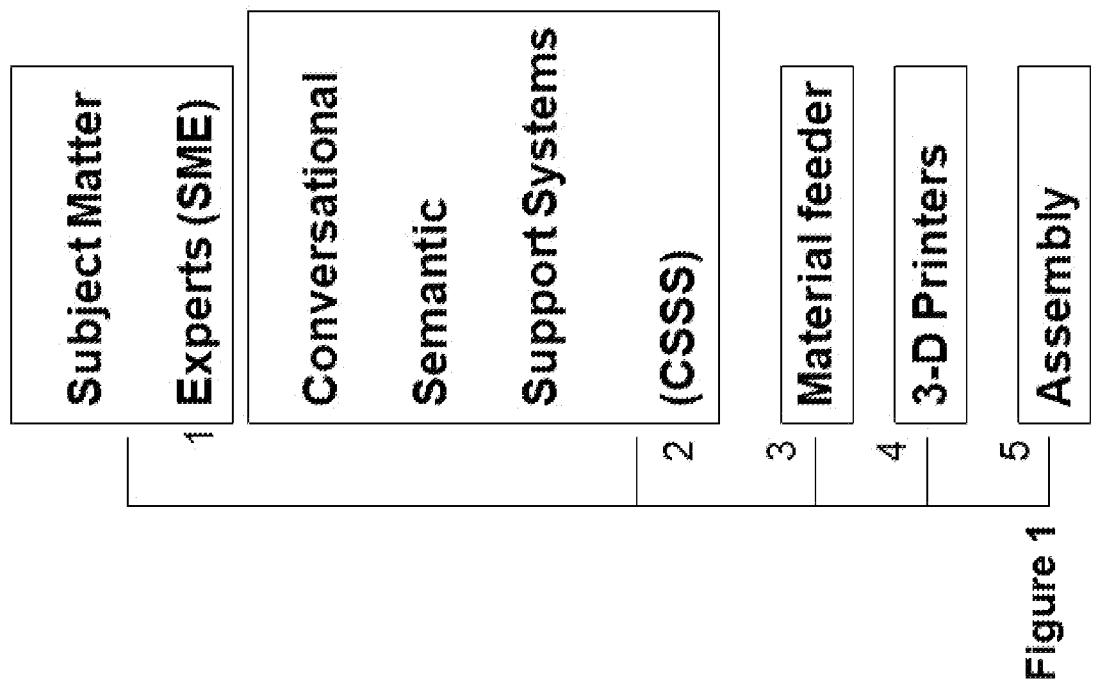
FIG. 1.
Development Factory with Conversational Semantic Support Systems
FIG. 2.
Conversational Semantic Support Systems (CSSS)
FIG. 3
Conversation Initiator
FIG. 4
Semantic Mapping System
FIG. 5
Business Rules and Scenario System
FIG. 6
Manufacturing Steps and Technological System
FIG. 7
Manufacturing Steps Execution
FIG. 8
Marketing Evaluation System
FIG. 9
Cluster of Semantic Graph Processing Units (SGPU) with Embedded Semantic Graph Processing System
Semantic Graph Processing units (SGPU) are grouped in clusters.
Each cluster is responsible for a specific knowledge domain, which includes many related subjects.
Figure 2:
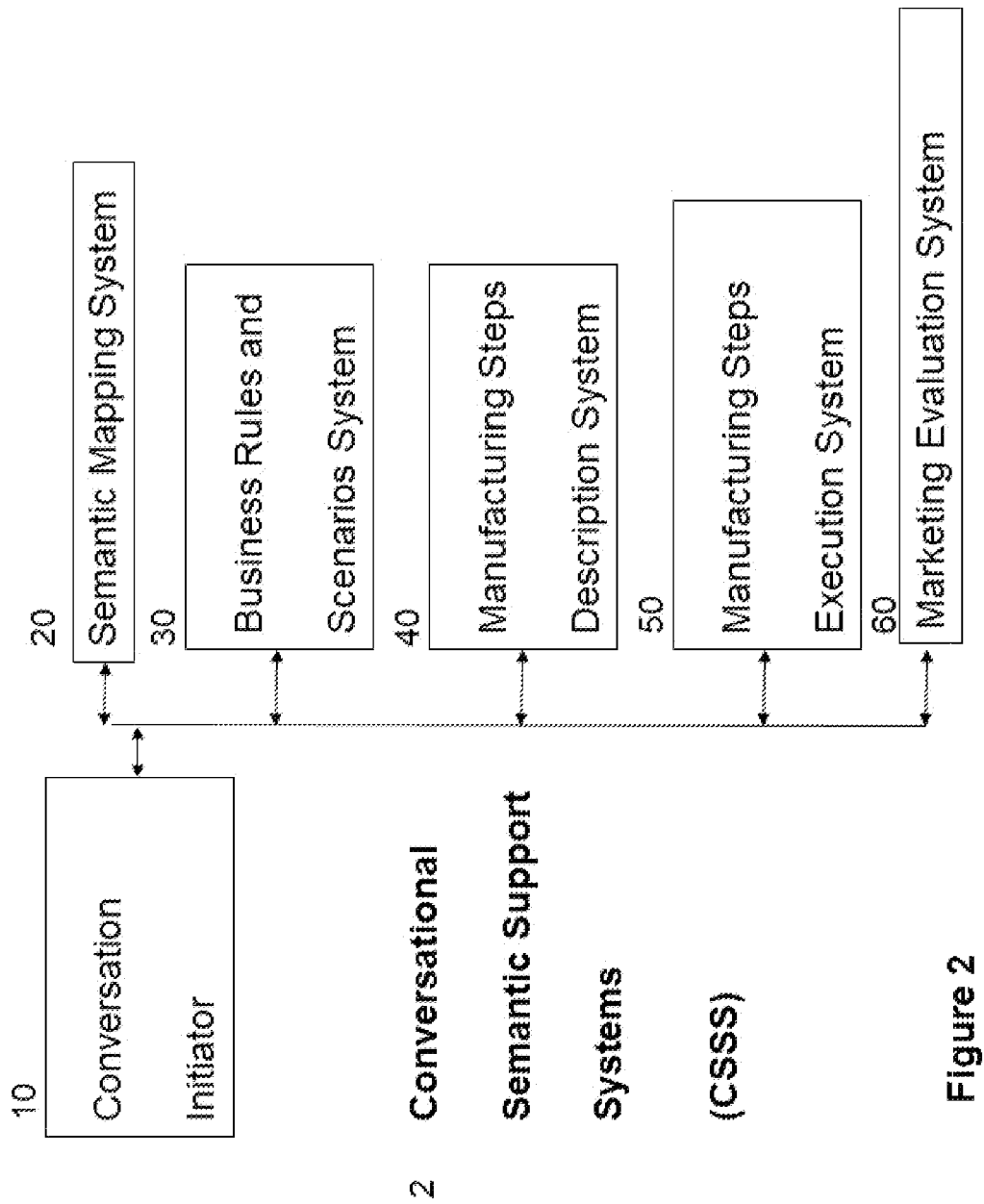
Figure 3:
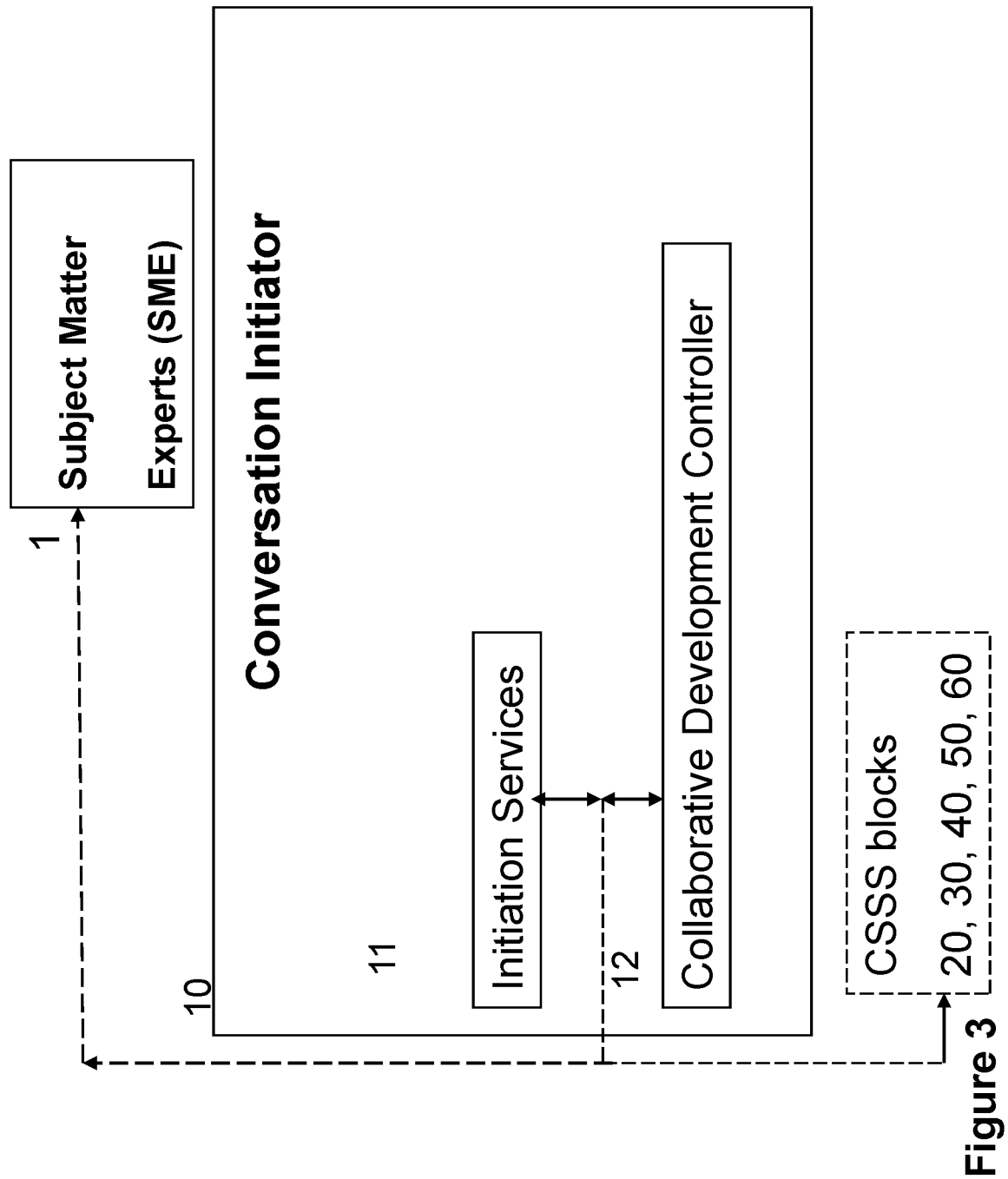
Figure 4:
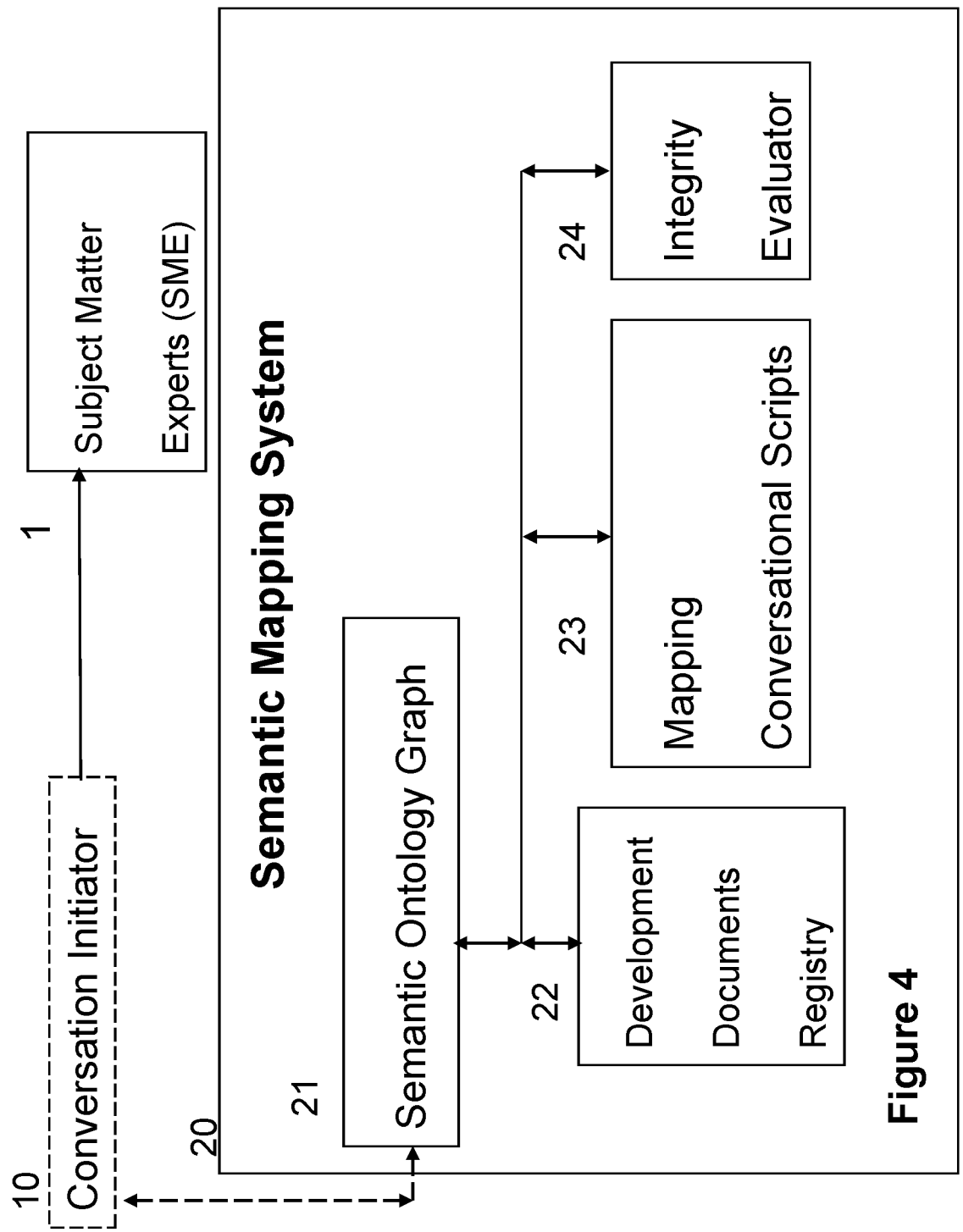
Figure 5:
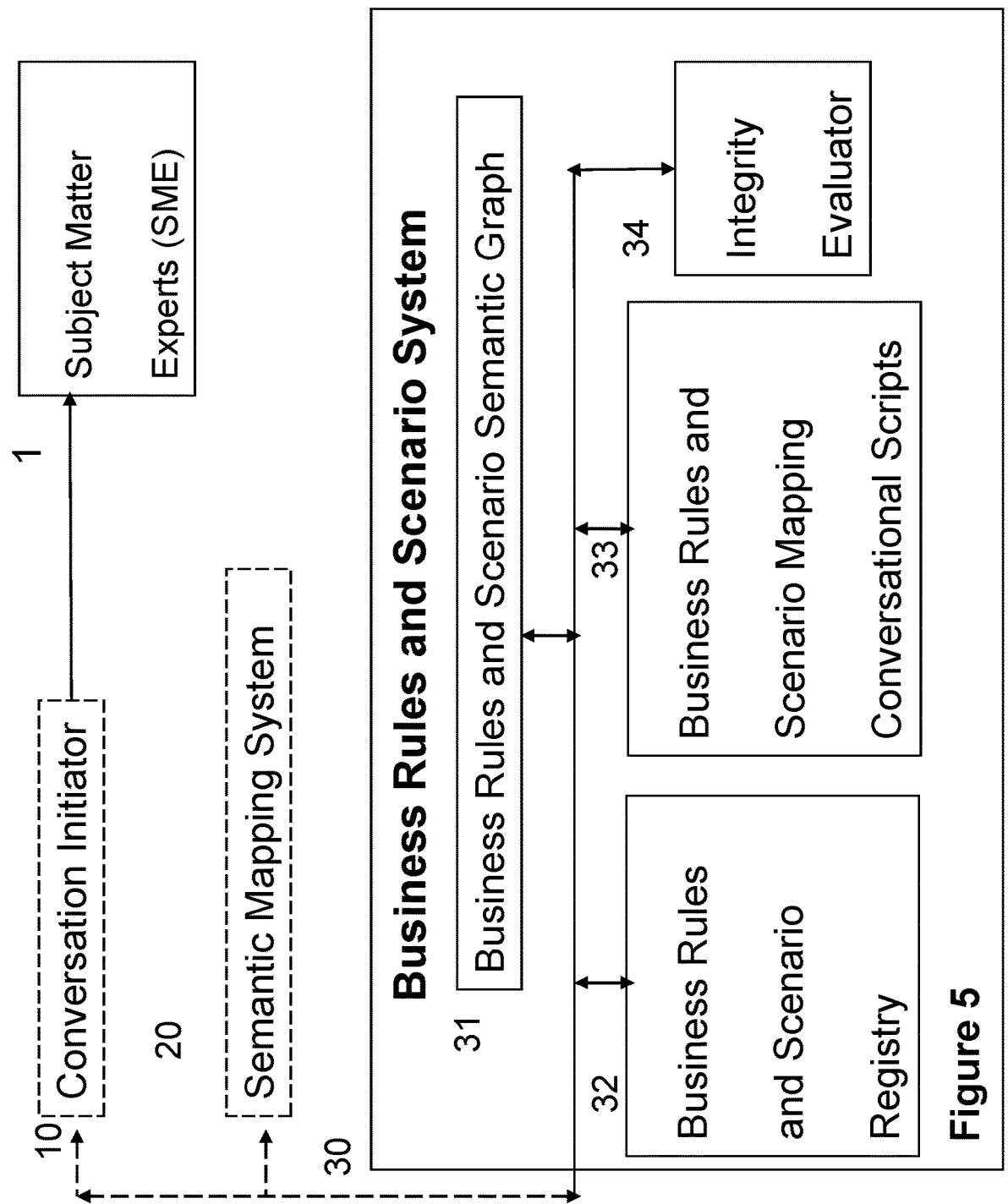
Figure 6:
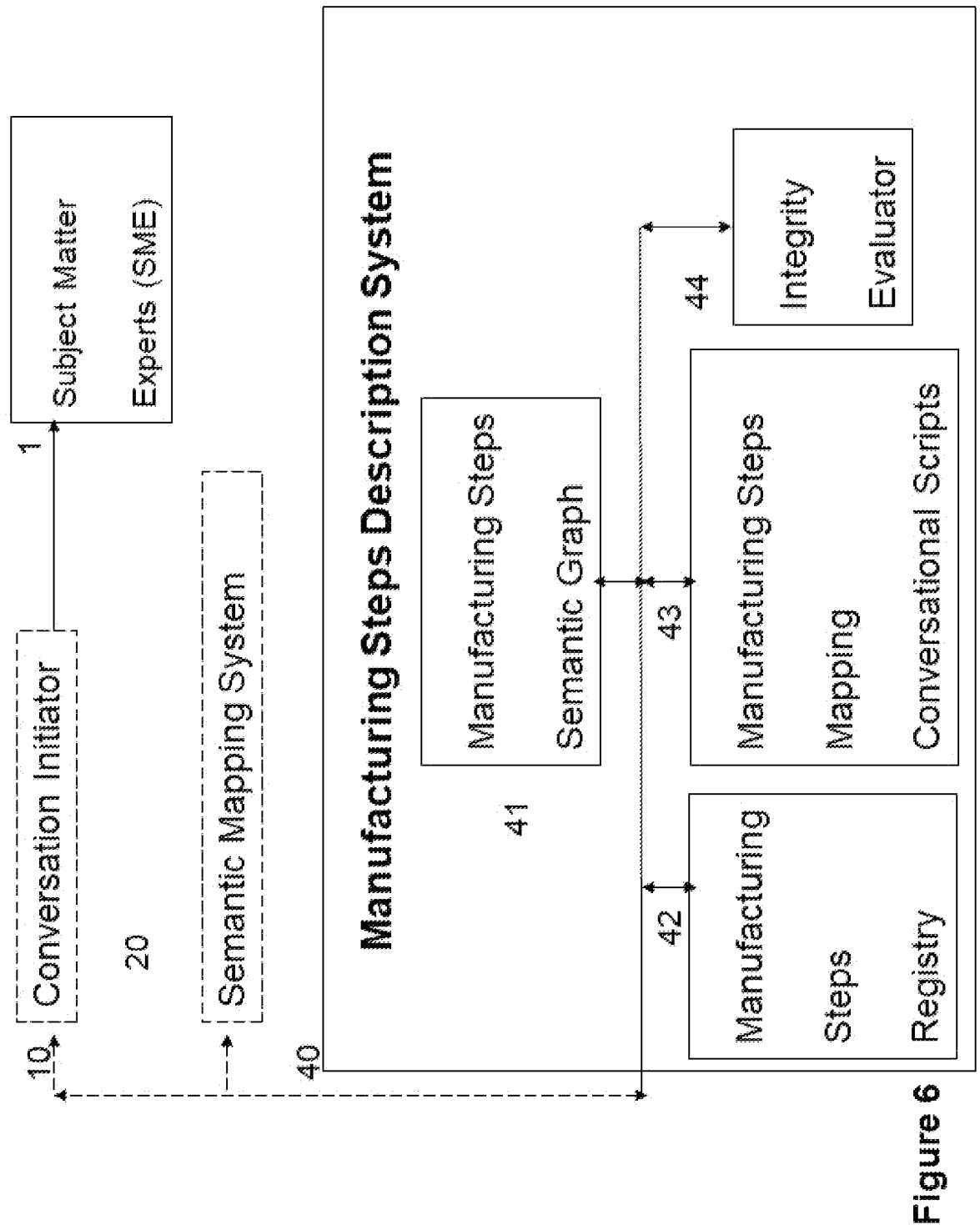
Figure 7:
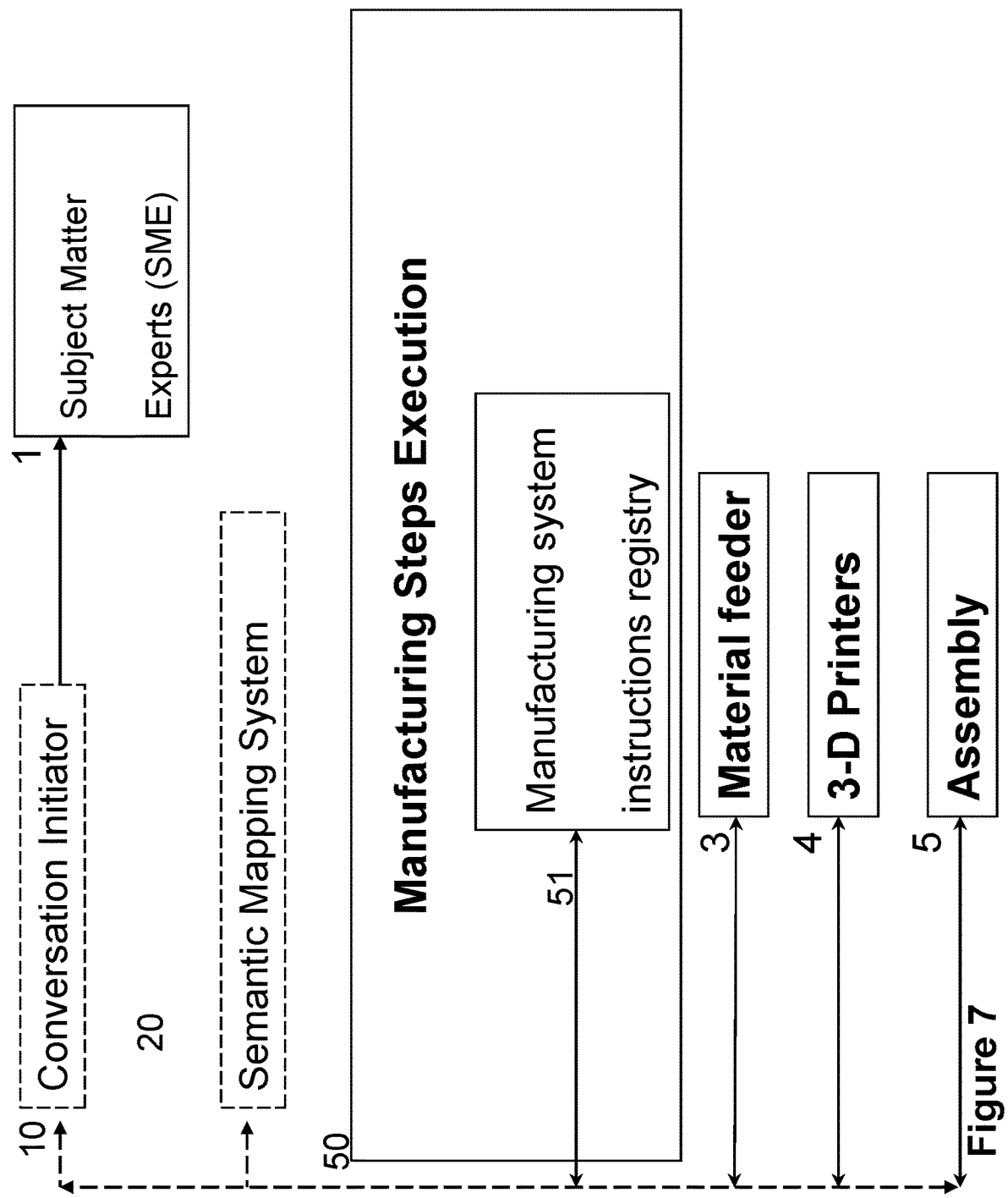
Figure 8:
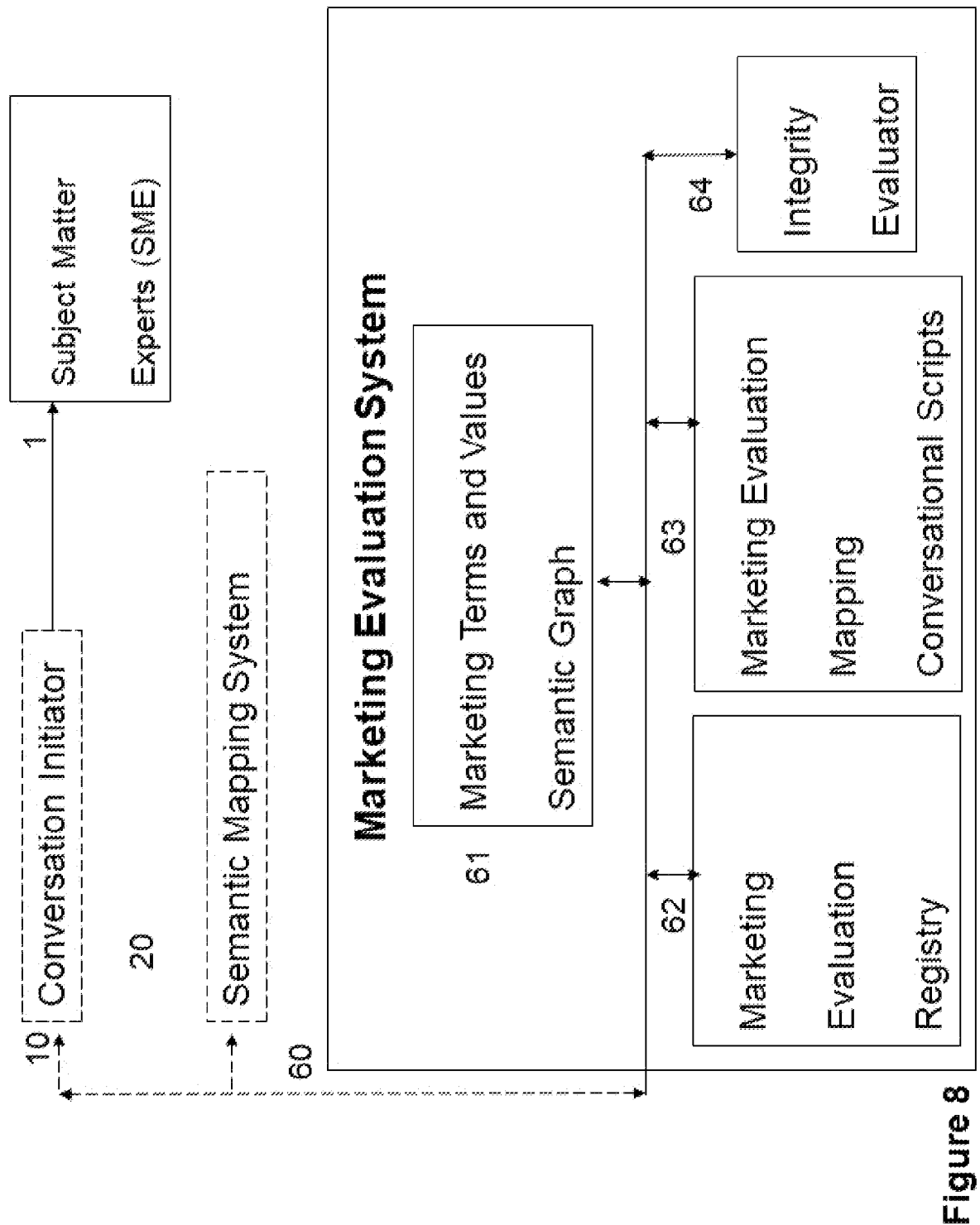
Figure 9:
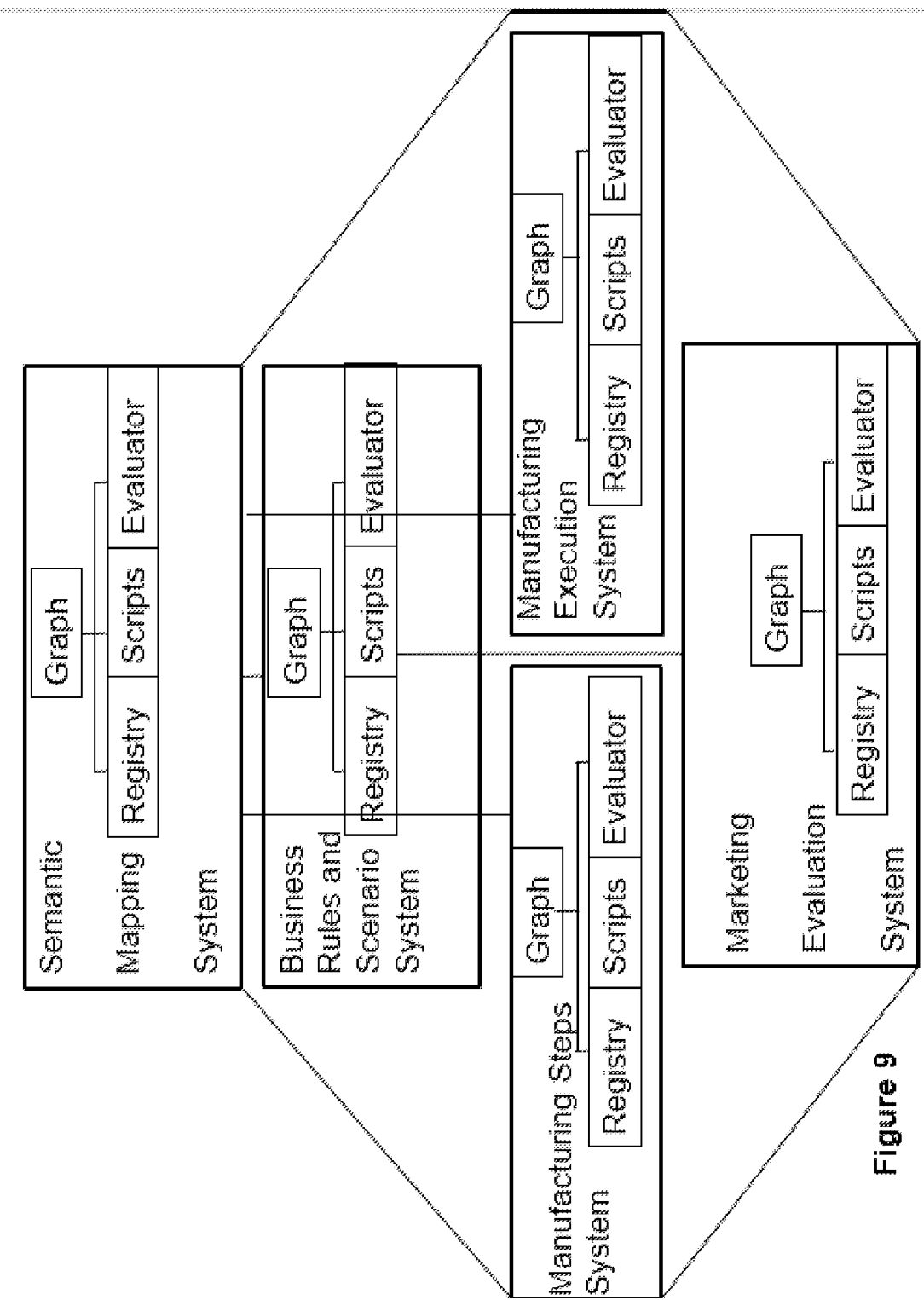
Figure 10:
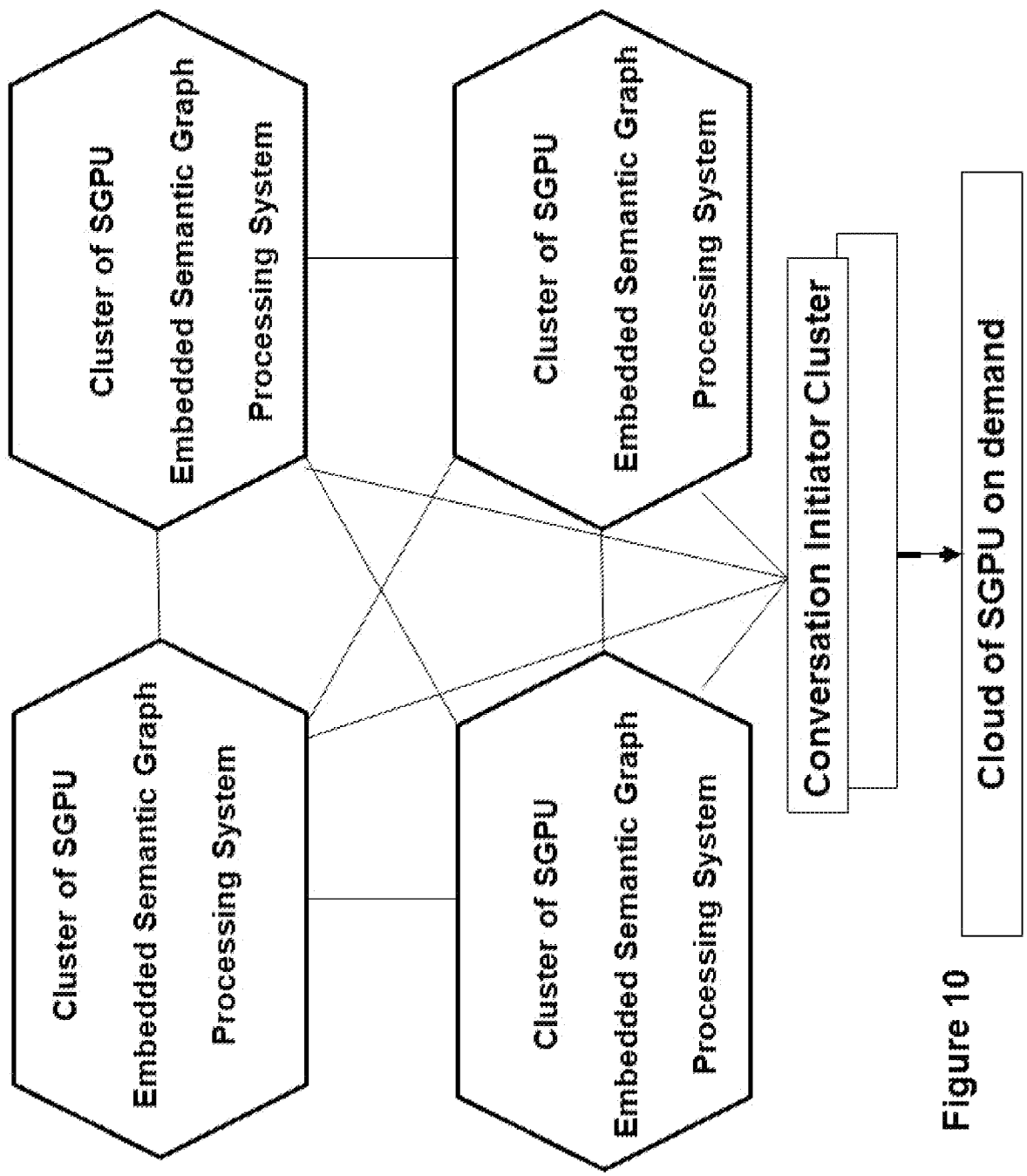
FIG. 10
Semantic Graph Processing Network
The clusters of Semantic Graph Processing units are connected in the Semantic Graph Processing Network Conversation Initiator is also implemented as a cluster of GPU.
When Conversation Initiator recognizes the subject already captured in SGPU clusters, the conversational stream, conversational request and response are focused on the cluster with detected knowledge domain.
If none of existing subjects match criteria, the system sends the request to a cloud with GPU resources for a new GPU on demand to capture information for a new subject.
Figure 11:
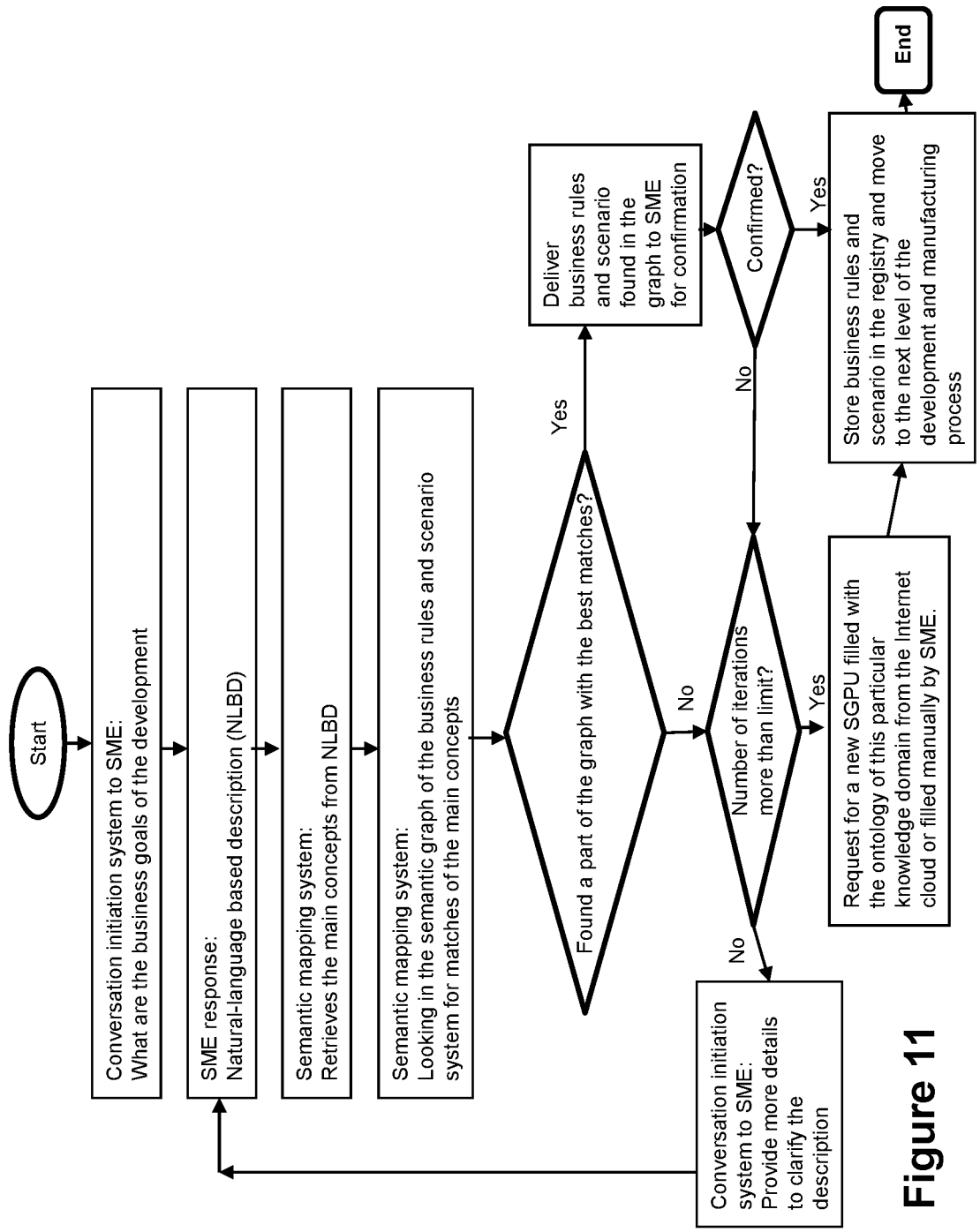
FIG. 11
A flowchart describes the algorithm of conversational translation of initial business goals of the development into business rules and scenarios.
Figure 12:
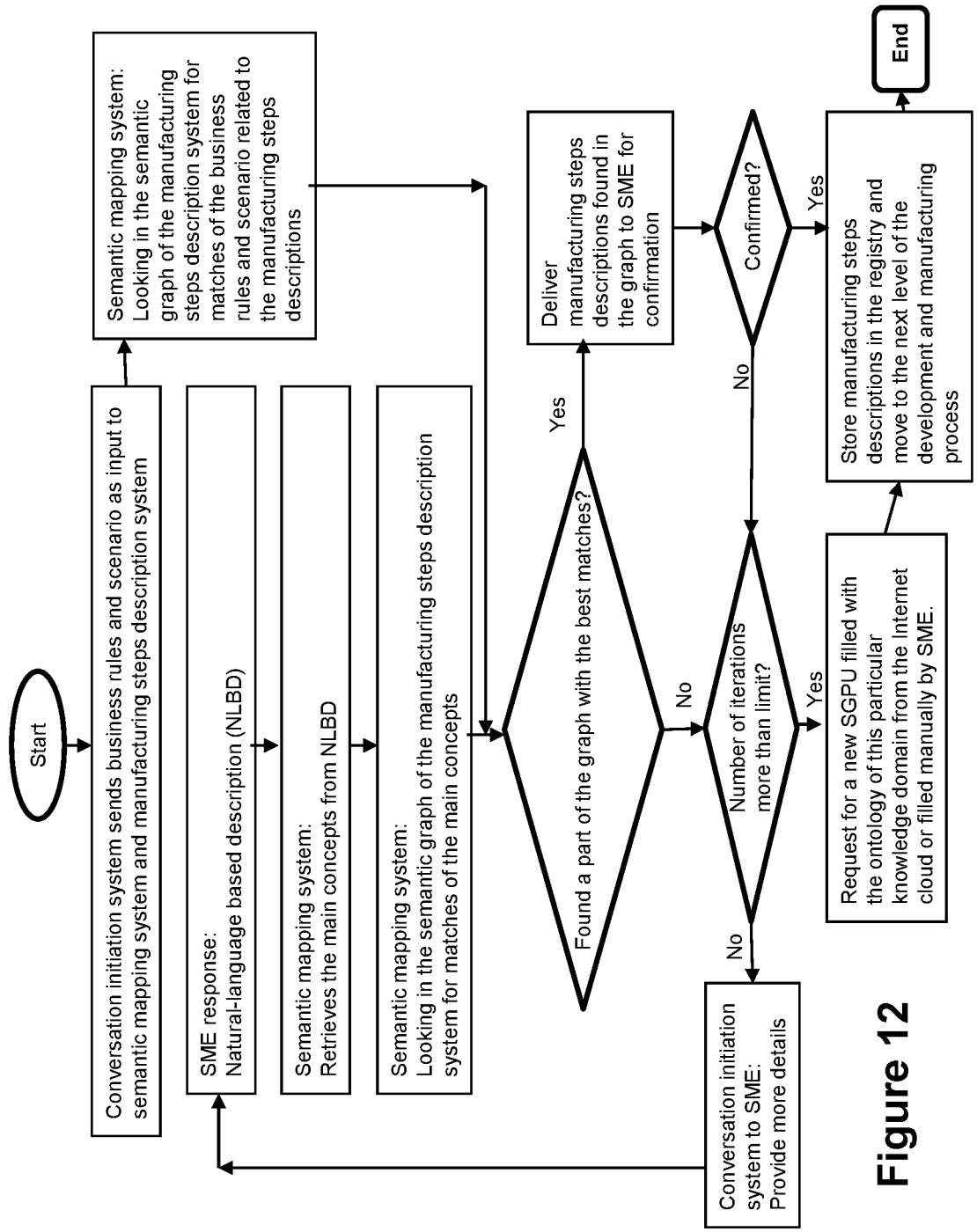
FIG. 12
A flowchart describes the algorithm of conversational translation of business rules and scenarios into manufacturing steps description system.
Figure 13:
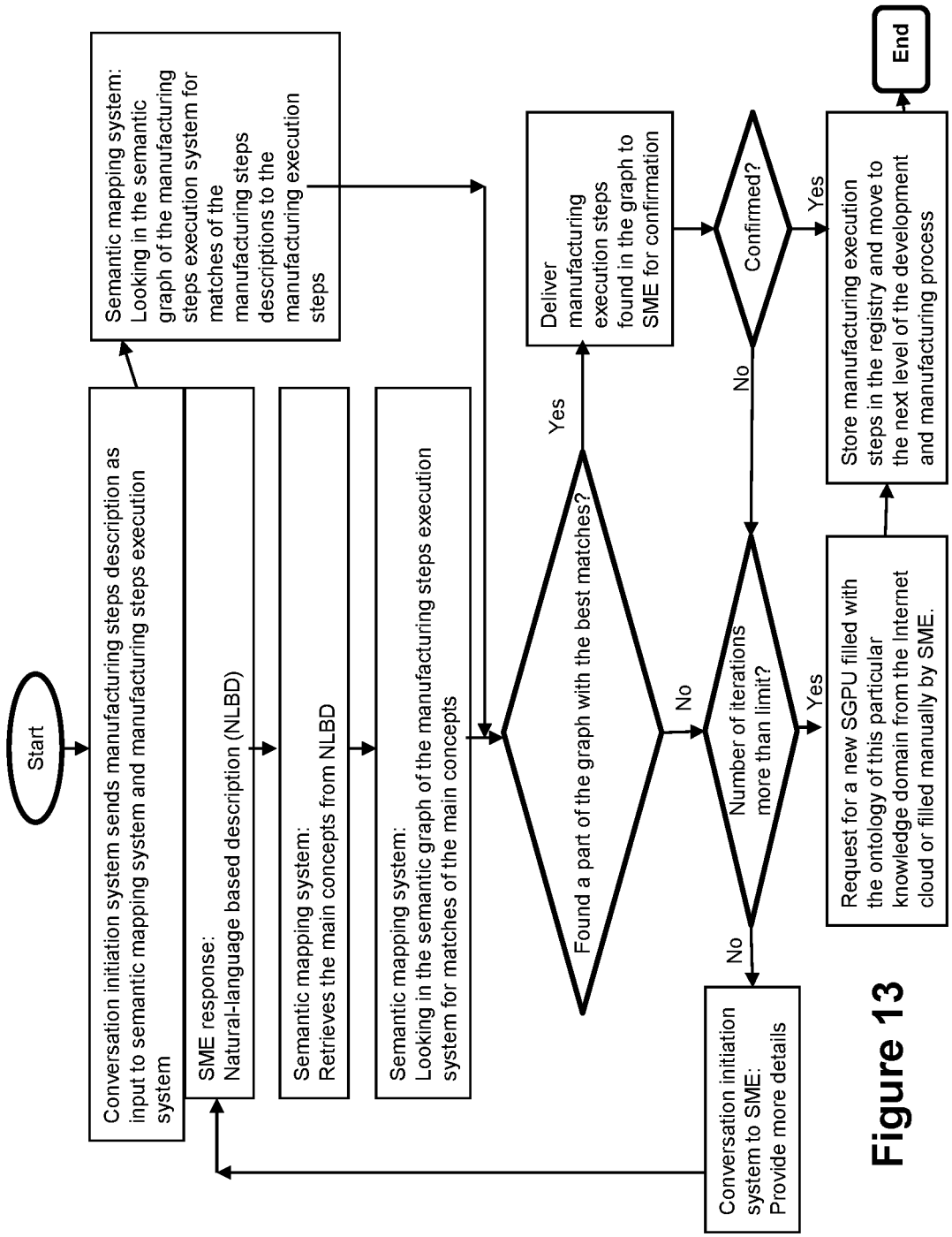
FIG. 13
A flowchart describes the algorithm of conversational translation of manufacturing steps description system into manufacturing steps execution system.
Figure 14:
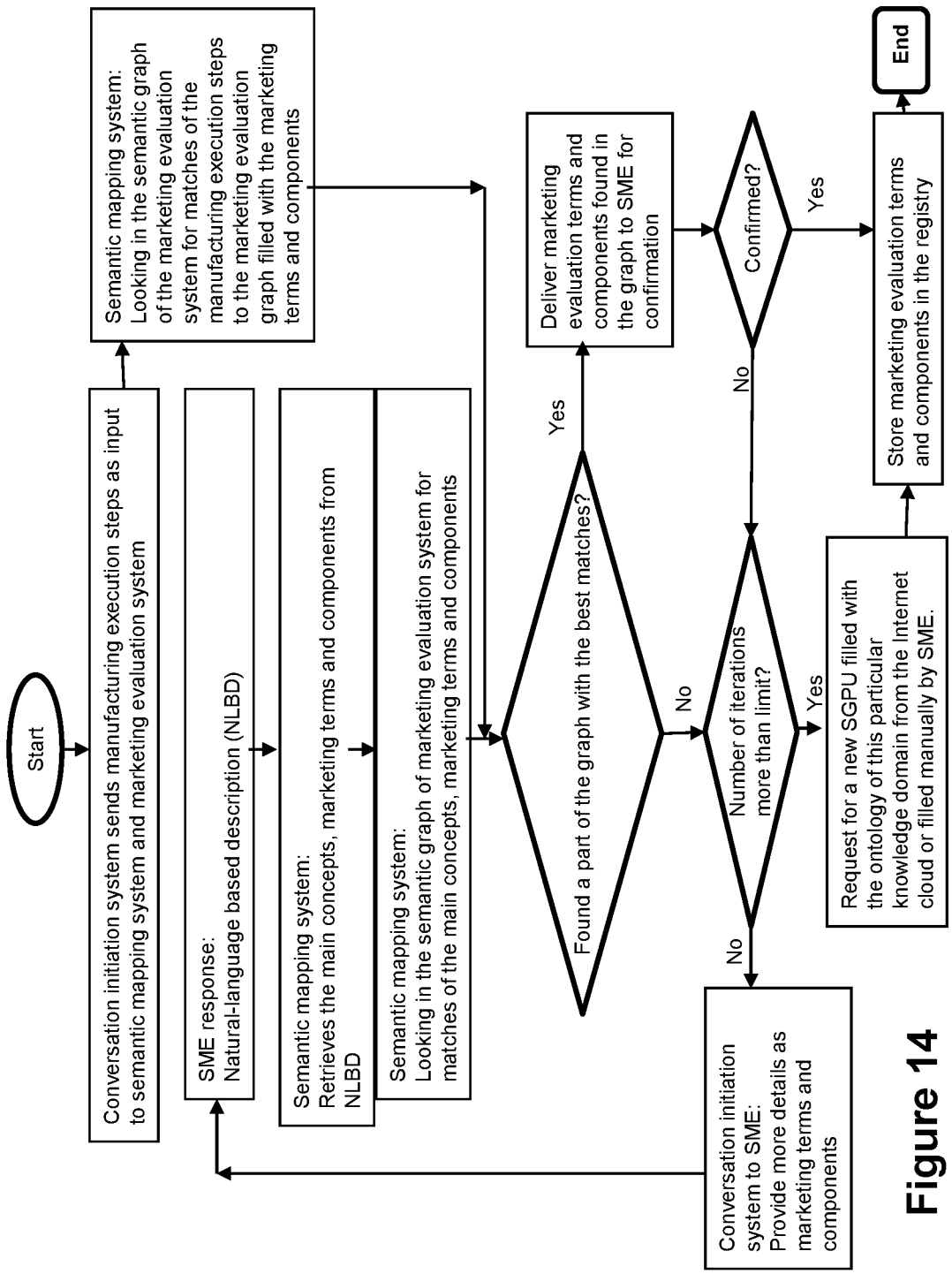
FIG. 14
A flowchart describes the algorithm of conversational translation of manufacturing steps execution system into marketing evaluation terms and components.

The system includes a network of the conversational semantic support systems, (CSSS), configured to communicate to a SME and provide mapping of the natural-language-based descriptions by the SME to more formal development and manufacturing instructions. This is a multiple step process going from business development goals to business rules and scenarios, and further to manufacturing steps descriptions and execution systems, and to marketing and evaluation system.

The main instrument for such mapping is a semantic mapping system, which uses for this purpose a proper semantic graph located in a proper sub-system of the CSSS.

The semantic mapping system is connected with several other systems, which represent several levels of development and manufacturing process, such as:
   a conversation initiator system,
   a business rules and scenarios system,
   a manufacturing steps description system,
   a manufacturing steps execution system,
   a marketing evaluation system.

The development factory accelerates a usual process of development and manufacturing by including conversational semantic transformation of natural-language-based descriptions into more formal development and manufacturing instructions on every level of the development and manufacturing process.

Every system that represents a level of development and manufacturing includes a proper semantic graph that represents ontology of that level, a proper conversational scripts helping to retrieve natural language descriptions and map them to the semantic graph, a proper registry to register a portion of a graph associated with a specific descriptions, and integrity evaluator, which ensure that newly registered portions do not conflict with previously existing solutions.

The ontology word has many meanings. In the context of this invention ontology is a method of science, a language, and more specifically a collection of data that describe some area of knowledge. Maybe the best explanation is by comparison with taxonomy, another method of semantic representation. Taxonomy collects keywords to describe content. Ontology uses more powerful methods to create more detailed meta-data models. In addition to collecting the key vocabulary, ontology picks up on the relationships between the keywords effectively building a semantically rich and much more meaningful model of the content.

Let us say that we have a sentence "Yefim Zhuk was born in Russia." Taxonomy would only use two keywords from the sentence, the name and the place. Ontology would also include the relationship between the two keywords, "was born", and create a graph representing the content in a greater level of detail. This graph can be extended and later used for querying, in other words, for asking questions related to this information, such as "when he was born".

Ontology is a formal representation of a specific knowledge domain, for example, business rules and scenarios related to development of aviation vehicles, approved by Federal Aviation Administration (FAA), present in one of ontology formats, Web Ontology Language (OWL), Resource Description Framework (RDF), JavaScript Object Notation (JSON) or other format, which describe a semantic graph with multiple object connections in a way understandable to many computer-based ontology tools.

A semantic graph represents the concepts of a knowledge domain and semantic relationships between concepts. A domain knowledge is knowledge of a specific, specialized discipline or field, in contrast to general knowledge, or domain-independent knowledge. Ontologies are created by subject matter experts, who specialized in such knowledge domains. Many ontologies, formatted as a semantic graph, can be found in the Internet cloud.

The invention uses CSSS to work with pre-loaded ontologies and when a new subject appeared not covered by available ontologies, the invention sends a request to find a proper ontology that covers such a subject or create a new one.

Every CSSS is specialized in one of knowledge domains. The conversational initiator system comprise of initiation services and a collaborative development coordinator. The collaborative development coordinator is configured to use the initial business goals and select the best suited CSSS as a task coordinator for further conversations with other CSSS while moving along the levels of the development and manufacturing process. To find the best suited CSSS the collaborative development coordinator is calculating the collaborative development criteria based on relevance of the business goals of the development to a business domain of the CSSS and defining the best suited CSSS as the task coordinator.

To calculate the collaborative criteria the collaborative development coordinator sends the business goals to the semantic mapping system, which performs the following steps:
   retrieving the main concepts of these natural-language-based descriptions,
   looking for these subjects in the semantic graph of a business rules and scenarios system in each CSSS.
   calculating the number of matches as the main factor of the collaborative development criteria.

The collaborative development coordinator then assigns the CSSS as the task coordinator based on the collaborative development criteria.

Retrieving the main concepts from the natural language description is done with, but not limited to, DBPedia or similar systems, see https://www.dbpedia-spotlight.org/.

The business rules and scenarios system includes business rules and scenarios conversational scripts, business rules and scenarios semantic graph, business rules and scenarios registry, and business rules and scenarios integrity evaluator.

These components: semantic graph, conversational scripts, registry, and integrity evaluator, are present in every system providing any level of development and manufacturing process.

The conversation initiation system starts a conversation requesting a SME to describe business goals of a project. As a SME describes business goals, the semantic mapping system retrieves the main concepts of these descriptions and looks for these subjects in the semantic graph of a business rules and scenarios system.

Retrieving the main concepts from the natural language description is done with, but not limited to, DBPedia or similar systems, see https://www.dbpedia-spotlight.org/.

The semantic mapping system is looking for the best matches in the graph and presents the result as a set of the business rules and scenarios for a SME approval. It is expected that the first attempts is not necessary final and a SME can reject it.

The rejection will prompt the next set of conversational scripts located in the business rules and scenarios system asking a SME for more details. Such conversation continues till a SME confirms the mapping and the resulting rules and scenarios are registered in the business rules and scenarios registry.

As the registry accumulates more solutions associated with natural language descriptions, the system becomes more knowledgeable and the conversations become shorter.

The business rules and scenarios represents the first level of the development and manufacturing process, establishing a formal plan for the next level.

After establishing the business rules and scenarios the conversation initiation system moves to the next level and starts a conversation with the manufacturing steps description system, then moves to the manufacturing steps execution system, and further to the marketing evaluation system. Results of the conversations in each level are stored in a registry of a proper system and serve as input for the next level of the development and manufacturing process.

The manufacturing steps description system (MSDS) represents the next level of formalization of the development and manufacturing process after the business rules and scenarios system.

MSDS includes a semantic graph that represents available at that moment ontology of MSDS, conversational scripts helping to retrieve natural language descriptions of MSDS and associate them to the semantic graph, a registry to register a portion of a graph associated with a specific manufacturing steps descriptions, and integrity evaluator, which ensure that newly registered portions do not conflict with previously captured solutions.

After establishing the manufacturing steps descriptions the conversation initiation system moves to the next level and starts a conversation with the manufacturing steps execution system.

The manufacturing steps execution system (MSES) represents the next level of formalization of the development and manufacturing process where the manufacturing steps descriptions are transformed into the execution steps.

MSES includes a semantic graph that represents available at that moment ontology of MSES, conversational scripts helping to retrieve natural language descriptions of MSES and associate them to the semantic graph of MSES, a registry to register a portion of a graph associated with manufacturing steps executions, and integrity evaluator, which ensure that newly registered portions do not conflict with previously captured solutions.

While these are standard levels of the development process, engaging conversational semantic support systems (CSSS) in each level accelerates the process making the development factory much more efficient.

Each CSSS, which includes the systems described above with their components, ontology of a specific knowledge domain with the semantic graph, the conversational scripts, the integrity evaluator and the registry, is built in the semantic graphics processing units (SGPU), which can be implemented, but not limited to graphics processing units (GPU) by Nvidia company.

Multiple SGPU, each with its own know specialization in a particular knowledge domain, are connected in an Internet cloud.

Whenever the conversation initiator comes up with a new subject where the subject of the conversation cannot be resolved within existing SGPU, the conversation initiator provides a request to fill in a new SGPU with the ontology of this particular knowledge domain from the Internet cloud or manually by SME.

The final steps of the development and manufacturing process engage manufacturing steps execution system (MSES). MSES is connected to manufacturing components, which include but not limited to a material feeder, 3-D Printers, and an assembly system.

An example of the material feeder, but not limited to, a system with access to different types of pre-ordered materials collected in a warehouse. The material feeder follows the instructions of the manufacturing steps execution system to cut necessary size, handle, and deliver selected materials to a 3-d printer to manufacture a product or a product part according to the instructions.

3-D Printers are industrial scale mechanisms, connected to a computer and capable manufacture parts from selected and delivered materials according to a computer program, which is produced by the manufacturing steps execution system.

An example of the assembly system, but not limited to, another system, which is handling assembly of a product from the product parts according to the instructions from the manufacturing steps execution system.

The marketing evaluation system accelerates the process of marketing evaluation of new products and services, helping to establish right expectations for the price of the products and scale of production.

The marketing evaluation system is providing the following steps for marketing evaluations:
  retrieving and storing usage and price terms of the developed and manufactured products, including but not limited to desired product and service value in dollars or a virtual score suggested by a potential client;
  tracking product and service requests and calculating the price values based on demand and estimated cost of production;
  negotiating service terms and values, where the negotiation starts with decision tree of the conversational scripts with the goal of maximizing the product price and still agreeing with client requests, and after pre-defined number of negotiation cycles, the conversational semantic support coordinator system will send a request to SME for confirmation and resolution of the resulting agreement.

The conversational initiation system is connected to the systems that represent the levels of the development process:
  the business rules and scenarios system,
  the manufacturing steps description system,
  the manufacturing steps execution system,
  the marketing evaluation system.

Each system includes proper conversational scripts, which are used by the conversational initiation system to start and continue the conversation with the plurality of SME and CSSS. The goal of every conversation is to retrieve initial information and more details regarding the current level of the development and manufacturing process and transform them into instructional form, to the degree that allows to move to the next level of the development and manufacturing process.

The conversational initiation system is also connected to the semantic mapping system, which is configured to perform such transformation by performing the following steps:
  calculating the collaborative development criteria based on relevance of the CSSS to a business domain of the CSSS and defining the best suited CSSS as the task coordinator,
  navigating over the semantic graph of the selected CSSS and creating conversational messages to define relevant branches of the graph,
  conversing with the business rules and scenarios system and mapping initial goals and requirements to the branches of the graph describing business rules and scenarios,
  conversing with the manufacturing steps description system and mapping business rules and scenarios to the branches of the graph describing manufacturing steps in the terms of technological standards, evaluating integrity and success of mapping with the existing semantic graph, and request additional information, if necessary, by conversing via the conversation initiator system with CSSS and SME, expanding a semantic graph with mapping results, which connect initial goals and requirements with business rules and scenarios and further to manufacturing steps described in technological standards, registering development documents, technical descriptions and diagrams, received from CSSS and SME in the process of collaborative development conversation and mapped to the semantic graph.

A simplest example would be creating a new web application. A SME would write "The application requires user to LOGIN." The program takes this sentence to its semantic mapping engine and finds an existing enterprise service, which can be reused here. The program do not assume that this is the only correct answer to the request. Instead, the program would ask for confirmation: "Do you mean to use the existing Authentication Service?" When a user confirms, the program continues, "Do you plan to use a set of User Privileges? If so, please specify, for example, Administrator, User, DBA, Editor, etc."

These conversations result in building the pieces of the application. Not all requests can be easily resolved. In such cases the program will try to retrieve more precise specifications, which can be mapped to existing service definitions. In the case of total mapping failure, the program will request a set of complete requirements followed by implementation and by semantically meaningful description. These new definitions done once will be added to the semantic mapping mechanism and will be found for a similar request.

Of course, the system will benefit developers only after it was significantly filled in with information provided in the cloud of ontologies. In the beginning, till clouds of ontologies are not available, most of requests will result in negative responses and the SME would manually find the solution and manually execute every development step.

The conversational system will capture the descriptions of every step in the proper sub-systems.

This is similar to storing log files as it is often done in computer systems. Except, the log files are formatted as RDF semantic graphs, so they are understood by the programs.

Then, the next time in a similar development process the conversational system will be able to find and use the technical details to automate several development steps.

Here a sample of the system's functionality:

When a SME starts initiation process by login in the system, a conversation initiator (CI) prompts the SME with a question:

What are your development goals?

As the SME start answering the question, CI explores the opportunity to collect more details on the goals to map the goals to some existing services.

For example, the SME answers:

building a flying car.

CI cannot find any mapping to this goal definition and will ask a deeper question:

What criteria would satisfy the goal?

SME provides the following details:

Minimum number of people in the car—2;

Minimum flight distance—100 miles

A car-plane with vertical take off

A car-plane with vertical landing

A semantic mapping system (SMS), which is connected to the conversation initiator system will be mapping natural language into technological descriptions, starting from business scenarios and manufacturing steps and further to standard-based technological descriptions;

The system would find (on the web or/and in BRSS) the business descriptions related to cars and to planes and come up with the alternatives—questions:

Is this a vehicle?

SME would confirm:—yes

CI/SMS will continue:

What kind of vehicle?

1. Car
2. Plane
3. Both

SME:—3.

CI/SMS

What is your vehicle power source:

1. electric,
2. oil or
3. hybrid

The SME answers:

Electric

CI/SMS would continue communicating with BRSS and continue questioning:

Alternative materials for the vehicle:

1. Material1—weight1—price1
2. Material2—weight2—price2

The SME would answer:—1 (selecting the first choice)

As this type of development did not happen before, CI/SMS would expand with a generic question:

More details or rules?

The SME would answer:

FAA regulations for flight elevation

This would lead to retrieving FAA rules from the network;

Most probably the first attempts like that would not be successful and the negative answer will force the SME to manually search, invent and describe a solution, which will be captured by the system, so the next time around the data will be available.

Think of that as storing a log file. storing in the semantic graph format, so the programs will understand and will be capable to map this information to business goals and scenarios describe in natural language.

The next step in the process is manufacturing a prototype.

The conversational system would ask if proper data are available from the manufacturing steps description system (MSDS).

If not, the first time the manufacturing will be done manually and the necessary descriptions will be captured by MSDS.

The next time these descriptions will be available to be passed to the manufacturing steps execution system (MSES).

A marketing evaluation system (MES) would use the information from previous steps to calculate the price of the prototype and start a conversation with a marketing SME to develop initial approach to marketing the product.

Then a SME would start a marketing campaign and continue conversing with MES to analyze results and correct the campaign, trying to evaluate marketing conditions, mass production quantity and negotiate the terms of usage and rates.

Initial conversations are based on initial generic scripts that prompt a SME for more details. With more information captured by a system, the scripts will benefit from new branches of logics in the semantic graphs related to each knowledge domain.

The invention claimed is:

1. A Development Factory for accelerated development and manufacturing products and services by subject matter experts, (SME) comprising of:
a network with a plurality of the conversational semantic support systems, (CSSS), configured to communicate to subject matter experts
and manufacturing components including but not limited to:
material feeder providing selected materials,
3-D Printers,
assembly system;
where CSSS, configured to support different knowledge domains, comprising:
a conversation initiator system, configured to initiate conversational communications with plurality CSSS and SME,
a semantic mapping system, which is connected to the conversation initiator system, and configured to associate natural language based information to the standard development and manufacturing protocols, starting from business scenarios and manufacturing steps descriptions and further to standard-based technological descriptions,
a business rules and scenarios system, which is connected to the conversation initiator system and the semantic mapping system, and configured to store the original development descriptions as business rules and scenarios,
a manufacturing steps description system, which is connected to the conversation initiator system, the semantic mapping system, and the business rules and scenarios system, configured to store the business descriptions further detailed into manufacturing steps and standard-based technological descriptions,
a manufacturing steps execution system configured to execute manufacturing steps and technological descriptions, which is connected to the conversation initiator system, the semantic mapping system, the business scenarios system, and the manufacturing steps description system,
a marketing evaluation system, which is connected to the conversation initiator system and the semantic mapping system configured to evaluate marketing conditions, approximation of mass production quantity and negotiation of the terms of usage and rates.

2. The development factory of claim 1 where:
the conversation initiator, further comprising the initiation services with initial scripts and the collaborative development controller, configured to converse with other CSSS and SME, when not all components of a development request can be found within a single CSSS;
the business rules and scenario system further comprising:
business rules and scenario semantic graph,
business rules and scenario registry,
conversational scripts configured as decision trees with multiple logical branches to retrieve SME responses and map natural language descriptions to business rules and scenario semantic graph,
integrity evaluator configured to check integrity of mapped business rules and scenarios;
the manufacturing steps description system further comprising:
manufacturing steps description semantic graph,
manufacturing steps description registry,
conversational scripts configured as decision trees with multiple logical branches to retrieve SME responses and map natural language descriptions to manufacturing steps description semantic graph,
integrity evaluator configured to check integrity of mapped manufacturing steps description;
the manufacturing steps execution system further comprising:
manufacturing steps execution semantic graph,
manufacturing steps execution registry,
conversational scripts configured as decision trees with multiple logical branches to retrieve SME responses and map natural language descriptions to manufacturing steps execution semantic graph,
integrity evaluator configured to check integrity of mapped manufacturing steps execution;
the marketing evaluation system further comprising:
marketing terms and values semantic graph,
marketing evaluation registry,
marketing evaluation mapping conversational scripts configured as decision trees with multiple logical branches to map natural language descriptions to a semantic graph,
integrity evaluator configured to check integrity of mapped marketing terms and values.

3. The development factory of claim 2, where:
the collaborative development controller further comprising a collaborative development criteria arranging one of the CSSS to become a task coordinator, configured to coordinate the conversations and negotiations for the current task.

4. The Development Factory of claim 2 where conversation initiators of different CSSS are connected into a conversation initiator cluster, further connected to a cloud of SGPU.

5. The Development Factory of claim 1 where:
the manufacturing steps and technological system further comprising:
a semantic graph describing manufacturing steps,
a manufacturing steps registry,
mapping conversational scripts configured to map natural language descriptions to the semantic graph describing manufactural steps;
the manufacturing steps execution system further comprising specific manufacturing system instructions registry;
the marketing evaluation system further comprising:
a semantic graph describing marketing terms and values,
marketing evaluation registry,
mapping conversational scripts configured to map natural language descriptions to the semantic graph describing marketing terms and values,
integrity evaluator configured to check integrity of the mapped marketing terms and values.

6. The Development Factory of claim 1 where:
the semantic graph is present in form of Web Ontology Language (OWL), Resource Description Framework (RDF), JavaScript Object Notation (JSON) or other format data, which describe a semantic graph with multiple connections between subsystems,
the semantic mapping system, business scenario system, manufacturing steps system, and marketing evaluation system are interconnected as a cluster of embedded semantic graph processing systems with semantic graph processing units (SGPU) configured to mapping natural language descriptions to semantic ontology graph;

the multiple CSSS, each with its own knowledge domain, are interconnected as a semantic graph processing network (SGPN).

7. A Development Factory method for accelerated development and manufacturing product and services by subject matter experts, (SME), connected via the network with a plurality of the conversational semantic support systems, (CSSS), specialized in different knowledge domains, comprising the following steps:
   initiating conversational communications with plurality CSSS and SME,
   propagating to the network a specialization graph describing knowledge ontologies supported by CSSS,
   receiving initial business goals from SME and CSSS, where initial business goals and requirements are present in natural language,
   defining the main concepts and related knowledge areas and "tag" the initial business descriptions with the meta-data,
   comparing the meta-data of the requirements with the specialization of a current CSSS,
   calculating and sending to the network the relevance index to define the level of participation in the current collaborative development and manufacturing process,
   initiating conversations with the plurality of CSSS to provide semantic association of the business goals and requirements to business rules and scenarios, then further down to manufacturing steps and standard-based technological descriptions,
   creating association graph, which is mapping information across all stages of the process,
   evaluating completeness of the mapping with validation of standard-based technological descriptions against existing standards,
   initiating conversational message exchange by sending request to CSSS and SME to retrieve missing information and fill in informational gaps in the process of semantic mapping,
   checking if association graph, at each step of its creation, reflects components of any previously created and archived graphs,
   if found, sending an archived association graph to the conversational message to confirm existing mapping,
   if association records are not found, continuing the conversation by sending a specific request for missing information to other CSSS and SME,
   if no information found, requesting the SME to manually fill in the informational gap in the process and converse with the SME to collect new information in the formatted semantic graph understood by a program, so the next time the system would be able to find and use these data for automation,
   checking for integrity of business rules and scenarios to reject a new rule or scenario which is in conflict with the existing rules and requesting the correction,
   transforming business rules and scenarios into manufacturing and execution steps as standard-based technological descriptions and conversing with SME for conformation and for missing information,
   initiating conversations with plurality of CSSS and SME for collecting marketing conditions, approximation of mass production quantity and negotiation of the terms of usage and rates,
   collecting ontology graph for the developed product and ranking the connections in the graph, calculating approximate demand and suggested terms of usage and rates based on the ranked connections and sending the results in the conversational line for corrections and negotiations,
   storing a history of conversations and negotiations to dynamically re-evaluate and rank the level of specialization of CSSS and SME according to their knowledge domains.

8. The Development Factory method of claim 7 where the semantic mapping system performing the following steps:
   calculating the collaborative development criteria based on relevance of the business goals of the development to a knowledge domain of the CSSS and defining the best suited CSSS as the task coordinator,
   navigating over the semantic graph of the selected CSSS and creating conversational messages to define relevant branches of the graph,
   conversing with the business rules and scenarios system and mapping initial goals and requirements to the branches of the graph describing business rules and scenarios,
   conversing with the manufacturing steps and technological system and mapping business rules and scenarios to the branches of the graph describing manufacturing steps in the terms of technological standards,
   evaluating integrity and success of mapping with the existing semantic graph, and request additional information, if necessary, by conversing via the conversation initiator system with CSSS and SME,
   expanding a semantic graph with mapping results, which connect initial goals and requirements with business rules and scenarios and further to manufacturing steps described in technological standards,
   expanding initial conversational scripts with new logical branches of the decision trees obtained as a result of new information provided by a SME,
   registering development documents, technical descriptions and diagrams, received from CSSS and SME in the process of collaborative development conversation and mapped to the semantic graph.

9. The Development Factory method of claim 7 further performing the following steps:
   navigating over the graph of business rules and scenarios to define relevant to the current task branches of the graph and generating conversational messages to address any missing data,
   conversing with semantic mapping system and mapping business rules and scenarios of the current task to the graph of business rules and scenarios,
   storing business rules and scenarios in the business rules and scenarios registry with the reference information, which is mapping the rules and scenarios to the semantic graph,
   evaluating integrity and success of mapping with the existing semantic graph, and request additional information, if necessary, by conversing via the conversation initiator system with CSSS and SME.

10. The Development Factory method of claim 7 where the manufacturing steps and technological system further performing the following steps:
   navigating over the graph of manufacturing steps to define relevant to the current task branches of the graph and generating conversational messages to address any missing data,
   conversing with semantic mapping system and mapping manufacturing steps of the current task to the graph of manufacturing steps, storing manufacturing steps in the manufacturing steps registry with the reference information, which is mapping the manufacturing steps to the semantic graph, evaluating integrity and success of mapping with the existing semantic graph, and request additional information, if necessary, by conversing via the conversation initiator system with CSSS and SME.

11. The Development Factory method of claim 7 where:

the manufacturing steps execution system further performing the following steps:

receiving instructions of the manufacturing steps including but not limited to:

specifying materials with material feeder instructions;
specifying 3-D printers and 3-D modeling instructions;
specifying assembly instructions;

transforming specific instructions for specific manufacturing systems into system-expected format;

the marketing evaluation system further performing the following steps:

navigating over the semantic graph describing marketing terms and values, providing marketing evaluation including but not limiting to:

product and service demand, access and usage conditions, generating conversational messages to address any missing data related to estimated production cost and price of the developed products, conversing with semantic mapping system and mapping marketing terms and values of the currently developed product and services to the semantic graph describing marketing terms and values;

conversing with CSSS and SME in the process of negotiation of marketing values, including but not limited to usage and price terms with potential clients, storing marketing terms and values in the marketing evaluation registry with the reference information, which is mapping marketing terms and values to the semantic graph, evaluating integrity and success of mapping with the existing semantic graph, and request additional information, if, no association found with the existing graph by conversing via the conversation initiator system with CSSS and SME.

12. The Development Factory method for accelerated development and manufacturing product and services of claim 7, further comprising the following steps for marketing evaluations:

storing usage and price terms, including but not limited to desired product and service value in dollars or a virtual score set by a potential client;

tracking product and service requests and calculating the marketing values based on demand and previous negotiations;

negotiating service terms and values, where the negotiation starts with rule-based computerized negotiations between CSSS, and after pre-defined number of negotiation cycles, the conversational semantic support coordinator system will send a request to SME for confirmation and resolution.

13. The Development Factory method of claim 7 where:

the semantic graph processing network (SGPN) performing the following steps:

processing and navigation over a semantic graph, providing direct communications between different knowledge areas captured by their semantic graphs, providing direct communications between processing units, which describe a single knowledge area from different perspectives, including but not limited by business goals, scenarios, manufacturing steps and technology perspectives.

14. The Development Factory method of claim 7 where a conversation initiator cluster further performing the following steps:

providing communications between conversation initiators of different CSSS, where the collaborative development controller of the conversation initiator directs conversation messages to a selected CSSS based on the knowledge areas and the load, providing a request for additional Semantic Graphics Processing Units (SGPU) when the conversation initiator comes up with a new subject in the knowledge area, where the number of subjects is beyond a pre-defined level, providing a new SGPU on demand to be loaded from the cloud or by SME with a new subject and connected to the semantic graph processing network.

* * * * *